(12) United States Patent
Alam et al.

(10) Patent No.: US 12,447,834 B2
(45) Date of Patent: Oct. 21, 2025

(54) ELECTRIC MACHINE WITH HYBRID ENERGY STORAGE DEVICES

(71) Applicant: VITO NV, Mol (BE)

(72) Inventors: Mohammad Meraj Alam, Mol (BE); Peter Coenen, Mol (BE); Klaas De Craemer, Mol (BE)

(73) Assignee: VITO N.V., Mol (BE)

( * ) Notice: Subject to any disclaimer, the term of this patent is extended or adjusted under 35 U.S.C. 154(b) by 340 days.

(21) Appl. No.: 17/788,495

(22) PCT Filed: Dec. 21, 2020

(86) PCT No.: PCT/EP2020/087478
§ 371 (c)(1),
(2) Date: Jun. 23, 2022

(87) PCT Pub. No.: WO2021/130174
PCT Pub. Date: Jul. 1, 2021

(65) Prior Publication Data
US 2023/0021793 A1     Jan. 26, 2023

(30) Foreign Application Priority Data
Dec. 24, 2019 (EP) .................................. 19219617

(51) Int. Cl.
*B60L 50/60* (2019.01)
*B60L 1/00* (2006.01)
(Continued)

(52) U.S. Cl.
CPC ................. *B60L 50/60* (2019.02); *B60L 1/00* (2013.01); *B60L 50/40* (2019.02); *B60L 58/12* (2019.02);
(Continued)

(58) Field of Classification Search
CPC .......... B60L 50/60; B60L 58/22; B60L 58/12; B60L 50/40; B60L 1/00; B60L 2210/10; H02K 7/025
See application file for complete search history.

(56) References Cited

U.S. PATENT DOCUMENTS 7,004,273 B1 * 2/2006 Gruenwald ........... B60W 20/13
180/65.245
7,573,151 B2 * 8/2009 Acena ..................... B60L 50/40
307/9.1
(Continued)

FOREIGN PATENT DOCUMENTS

DE      102014202992 A1    8/2015
EP          0564149 A2    10/1993
(Continued)

OTHER PUBLICATIONS

"Supercapacitors vs. Battery Comparison Chart", Arrow, Oct. 9, 2018, URL: https://www.arrow.com/en/research-and-events/articles/supercapacitors-vs-battery-comparison-chart (Year: 2018).*
(Continued)

*Primary Examiner* — Naeem Taslim Alam
(74) *Attorney, Agent, or Firm* — Ipsilon USA—NLO

(57) ABSTRACT

An electric machine including a first energy consuming unit and a second energy consuming unit, the first energy consuming unit requiring a higher power energy source and the second energy consuming unit requiring a lower power energy source, wherein the machine further includes a first energy storage device and a second energy storage device, the first energy storage device having a higher power with respect to the second energy storage device, wherein the first energy storage device is configured to power the first energy consuming unit, wherein the second energy storage device is configured to power the second energy consuming unit, and wherein the first energy storage device is connectable to a
(Continued)

charger for charging, the first energy storage device requiring a lower charging time for reaching its maximum state of charge than the second energy storage device, and wherein the first energy storage device is configured to directly provide power to the first energy consuming unit.

18 Claims, 5 Drawing Sheets

(51) Int. Cl.
*B60L 50/40* (2019.01)
*B60L 58/12* (2019.01)
*B60L 58/22* (2019.01)
*H02K 7/02* (2006.01)

(52) U.S. Cl.
CPC .............. *B60L 58/22* (2019.02); *H02K 7/025* (2013.01); *B60L 2210/10* (2013.01)

(56) References Cited

U.S. PATENT DOCUMENTS

| | | | | |
|---|---|---|---|---|
| 2005/0061561 | A1* | 3/2005 | Leonardi | B60W 20/10 180/65.21 |
| 2007/0090808 | A1* | 4/2007 | McCabe | B60L 50/40 320/137 |
| 2009/0112384 | A1* | 4/2009 | Jeon | H01M 8/04302 701/22 |
| 2011/0100735 | A1 | 5/2011 | Flett | |
| 2012/0271758 | A1 | 10/2012 | Jammer | |
| 2014/0358350 | A1 | 12/2014 | Schmidt et al. | |
| 2015/0084413 | A1 | 3/2015 | Benchetrite et al. | |
| 2017/0093186 | A1 | 3/2017 | Takizawa et al. | |
| 2017/0106899 | A1* | 4/2017 | Xu | B60L 1/003 |
| 2020/0063705 | A1* | 2/2020 | Isaranggulnaayudhya | F02N 11/0866 |
| 2024/0300275 | A1* | 9/2024 | Anderson | H02K 7/14 |

FOREIGN PATENT DOCUMENTS

| | | |
|---|---|---|
| EP | 1366948 A1 | 12/2003 |
| JP | H07163016 A | 6/1995 |
| JP | 2010111381 A | 5/2010 |
| JP | 2012080612 A | 4/2012 |
| JP | 2014082921 | 5/2014 |
| JP | 20151362632 | 7/2015 |
| JP | 2019083687 | 5/2019 |
| WO | 2013016542 A2 | 1/2013 |
| WO | WO2013118612 A1 | 8/2013 |
| WO | 2014109892 A2 | 7/2014 |
| WO | 2014115209 A1 | 7/2014 |
| WO | 2017/085051 A1 | 5/2017 |

OTHER PUBLICATIONS

"Discover how the Supercapacitor can enhance the battery.", ES Components, Sep. 8, 2017, URL: https://www.escomponents.com/blog/2017/9/8/discover-how-the-supercapacitor-can-enhance-the-battery (Year: 2017).*

International Search Report and Written Opinion—PCT/EP2020/087478—mailing date Jul. 1, 2021.

* cited by examiner

ELECTRIC MACHINE WITH HYBRID ENERGY STORAGE DEVICES

CROSS-REFERENCE TO RELATED APPLICATIONS

This application is a U.S. National Stage application under 35 U.S.C. § 371 of International Application PCT/EP2020/087478 (published as WO 2021/130174 A1), filed Dec. 21, 2020, which claims the benefit of priority to Application EP 19219617.8, filed Dec. 24, 2019. Benefit of the filing date of these prior applications is hereby claimed. Each of these prior applications is hereby incorporated by reference in its entirety.

FIELD OF THE INVENTION

The invention relates to an electric machine including a first energy storage unit and a second energy storage unit. Further, the invention relates to a method of arranging an electric machine.

BACKGROUND TO THE INVENTION

Various electric machines have rechargeable energy storage units as a power source. Batteries are a preferred choice for energy storage in applications that can't always be powered directly from the electric grid yet require electricity to run.

An example is a battery electric vehicle (BEV). However, unlike diesel or gas powered vehicles, charging time of a BEV is more or less equivalent to the autonomy (discharging time). This can range from ½ hour to several hours. In some applications, where high availability of vehicles is needed, hybrid solutions are preferred but the vehicle in that case can no longer remain fully electric.

Typically, electric vehicles such as autonomous guided vehicles (AGV), have a rechargeable battery pack as a power source. The electric vehicles can be arranged to operate on a battery pack with a plurality of batteries. Common used batteries are lead acid batteries or lithium ion batteries. Lead acid batteries typically have to be charged fully. A disadvantage is that the lead acid battery has a relatively long charging duration. Such a longer charge time can result in a longer non-productive time for the electric machine (e.g. electric vehicle), which in turn has a significant detrimental effect on the efficiency.

In factories or e-commerce warehouses, material handling or parcels for delivery typically have to be transported 24 hours a day, seven days a week. This is increasingly achieved by using electric forklifts or even autonomous guided vehicles (AGVs) instead of warehousemen. These small/medium vehicles must operate fully automatically with minimum nonproductive time. To this extent, AGV charging strategies and energy management strategies are crucial to increase productivity. Industrial indoor applications (forklifts AGVs) require high availability and zero emissions so they need fast electric charging.

To be able to charge in a few minutes, the amount of power is so high that a battery needs to be over-dimensioned considerably. If an autonomy of one hour is targeted, the battery will be cycled around 20 times/day which leads to a fast degradation. Thus AGVs are spending considerable time (>20% of total duration) in recharging the conventional batteries (lead-acid type) due to their slow charging time. The duration of charging is therefore affecting the overall productivity of the plants, factories or warehouses.

For lead acid AGVs for example, the percentage of time that the vehicle is immobilized for charging is typically more than 20 percent, and can be even around 40 percent. For example, in 8 hours, it is more or less 3 hours of charging and 7 hours of operation. In some cases, 20 to 30 percent additional AGVs are used to resolve this issue, but that is expensive and typically involves operational difficulties. Moreover, a floor space in a plant is typically a limited resource, and an immobilized vehicle take up the plant floor space. Around a quarter of the vehicles may be charging all the time and multiple chargers may be needed. This makes it an overall expensive and inefficient solution.

Conventional solutions provide for a slow charging, therefore electrical machine (e.g. vehicle) productivity tends to be low. Often, the battery of the electric vehicle is to over-dimensioned, hence resulting in a bulky and heavy design. The costs are therefore also higher. Furthermore, the batteries may age prematurely, leading to a high estimated operational expenses (OPEX). Additionally or alternatively, charging while performing an actuation action (e.g. loading/unloading) can create overvoltage issues for the energy source. Moreover, no backup energy source may be available in case the battery is depleted.

There is a need for an improved design of the electric machine in order to cope with at least one of the above-mentioned drawbacks.

SUMMARY OF THE INVENTION

It is an object of the invention to provide for a method and a system that obviates at least one of the above mentioned drawbacks.

Additionally or alternatively, it is an object of the invention to provide for an electric machine having an improved operational efficiency.

Additionally or alternatively, it is an object of the invention to provide for an electric machine with shorter electrical charging time intervals.

Additionally or alternatively, it is desired to decrease the non-productive time of electric machines.

Thereto, the invention provides for an electric machine including a first energy consuming unit and a second energy consuming unit, the first energy consuming unit requiring a higher power energy source and the second energy consuming unit requiring a lower power energy source, wherein the machine further includes a first energy storage device and a second energy storage device, the first energy storage device having a higher power with respect to the second energy storage device, wherein the first energy storage device is configured to power the first energy consuming unit, wherein the second energy storage device is configured to power the second energy consuming unit, and wherein the first energy storage device is connectable to a charger for charging, the first energy storage device requiring a lower charging time for reaching its maximum state of charge than the second energy storage device, and wherein the first energy storage device is configured to directly provide power to the first energy consuming unit.

The invention may provide for fast charging, such that less vehicles are needed. This may result space saving on factory floor for example. Furthermore, the energy transferred to the second energy storage device (e.g. battery) does not need to return to the first energy storage device (e.g. ultracap), resulting in less losses. Furthermore, there may be no need to pass drive power through a DC/DC, resulting in less losses. A small DC/DC converter may be sufficient to drive auxiliary systems, for example. Moreover, no voltage regulator may be needed for on-board loads. For example, smaller ultracaps may result in space saving. The battery can automatically back-up ultracaps (due to DC/DC converter topology). Furthermore, the first energy storage device can charge while manipulating, operating during standstill, hence no dedicated charging time. Moreover, the energy storage system may be directly compatible (size, weight, voltage, energy) with existing hardware (e.g. AGV previously powered by lead acid batteries), enabling retrofitting. Advantageously, an over-sized battery or over-sized first energy storage device (e.g. ultracap) can be avoided. Furthermore, an increased charging time or additional chargers can also be avoided.

The charging time for the electric machines can be seen as a bottle neck for the overall increase in efficiency, productivity, etc., in various applications. The percentage of time that the vehicle is immobilized for charging can be significantly reduced. In some examples, it can be brought in a range smaller than 5 percent, even close to 1 percent. By minimizing the downtime due to the charging, the number of electric machines (e.g. vehicles) needed and the number of chargers can be reduced. This has a significant impact on the complete chain in which the electric machines are used.

The invention may provide for a solution for an electric storage device (hybrid storage device) that can be charged in the matter of a few minutes, yet provide autonomy to an application 10 to 20 times longer than the charging time with the a main objective of maximum productive time and minimum charging time.

Optionally, the first energy storage device has a lower energy capacity with respect to the second energy storage device.

Optionally, the first energy storage device and the second energy storage device are connectable to a charger for charging.

Optionally, the first energy storage device includes one or more super-capacitors, and wherein the second energy storage device includes one or more batteries.

The invention enables a quick charging of the first energy storage device, used for powering the first energy consuming unit (e.g. drive propulsion for electric vehicles, providing high-power actuation for a tool, etc.). The second energy storage device (e.g. battery) can be used for auxiliary systems (e.g. onboard electronics, communications units, actuators, materials handling, cooling, heating, etc.). The energy of the first energy storage unit is consumed by distance (per unit displaced distance), whilst the energy of the second energy unit may be consumed per unit time. The first energy storage unit may for instance be embodied as ultracaps, wherein the ultracaps are designed and dimensioned as small as possible for the particular application, since ultracaps have a relatively small energy capacity/content.

It will be appreciated that various examples are provided with the first energy storage unit being embodied as one or more supercaps or ultracaps. However, other high power storage devices may also be employed, such as e.g. a flywheel, or airpressure, hydraulic pressure, etc., which can enable fast charging. For example, a flywheel is an electromechanical device, the energy is input through an electric motor, and the energy is recovered via the generator (typically same unit as motor).

Optionally, the first energy storage device and the second energy storage device are adapted such that the second energy storage device automatically provides a backup power source for powering the first energy consuming unit when a voltage of the first energy storage device is below a voltage threshold value.

In some examples, the second energy storage device (e.g. Li-ion battery) can be configured to serve as a backup in case the voltage of first energy storage device (e.g. Ucap) drops below a certain threshold, and then supply energy to drive the AGV. In this fashion, the first energy storage device (e.g. Ucaps) can be charged from the second energy storage device (e.g. battery).

Optionally, wherein the electric machine comprises a circuit element arranged between the first and second energy storage devices, wherein the circuit element is configured to allow current to flow only in a single direction from the second energy storage device to the first energy consuming unit.

By means of the circuit element, the electric machine does not require a complex control system for achieving the back-up system. Also the reliability of the back-up system can be improved. The second energy storage device can automatically provide a back-up energy source if needed, with electric current passing the circuit element.

Optionally, the circuit element is a unidirectional current flow component. The circuit element may be configured to operate like a one-way valve for electric current.

Optionally, a diode is arranged between the second energy storage device and the first energy storage device, wherein current flows from the second energy storage device through the diode to the first energy consuming unit in case the second energy storage device provides a backup power source for the first energy consuming unit.

The second energy storage device and the first energy storage device may have different voltages. If the state of charge in the first energy storage device is depleted/empty, the second energy storage device can be configured to automatically take over and provide the energy source needed to travel in limp mode to the nearest charger. In such a case, an additional converter may not be required. The voltage of the first energy storage device can be equal to that of the second energy storage device (diode, 0.4 V difference) . Hence, there is no current flowing to the first energy storage device, unless there is a load to the first energy storage device. The current is flowing to the load.

In case of an electric vehicle, the motor drive may handle the voltage window of the first energy storage device, which can be a relatively large voltage window (between 30 and 60 V for example). That may be no issue for the motor drive, but it can be problematic for the onboard electronics. This can be handled by arranging a DC-DC converter between the first energy storage device and the second energy storage device. In some examples, the backup system does not charge the first energy storage device from the second energy storage device. Current can be directly transferred from the second energy storage device to the vehicle propulsion. The second energy storage device will take control of the propulsion rather than charging the first energy storage device. However, in some examples, with an additional DC-DC convertor (or bidirectional DC-DC convertor) the first energy storage device can be charged. Then full power may be provided when an acceleration of the vehicle is required.

The voltages of the first energy storage device and the second energy storage device can be adapted (designed/tailored) such that they match in a way that the second energy storage device automatically backups the first energy storage device when the first energy storage device is almost empty. In this way, a diode can be employed instead of a DC-DC converter, providing a cheaper design. A diode is a relatively cheap device (much cheaper than a DC-DC converter). A lower voltage limit can be little bit lower than the nominal voltage of the second energy storage device, so when the second energy storage device has enough charge, it can automatically backup the propulsion.

When the circuit element is a diode, a simple design can be obtained providing an effective, reliable and automatic energy source back-up if needed. In some examples, a unidirectional converter can be arranged parallel to the diode.

It will be appreciated that the diode can be replaced by any component which is configured to act like a diode such as to conduct current primarily in one direction, in operation (e.g. an electrically or electronically controlled circuit element).

Optionally, the circuit element is an electronic controlled switch configured to allow current flow only in one direction from the second energy storage device to the first energy consuming unit in case the second energy storage device provides a backup power source for the first energy consuming unit.

Optionally, the circuit element is a solid state controlled switch. Advantageously, electric losses due to a voltage drop can be reduced and/or prevented.

Optionally, a direct-current/direct-current (DC/DC) convertor is arranged between the first energy storage device and second energy storage device, the DC/DC enabling at least current flow from the first energy storage device to the second energy storage device.

Optionally, the DC/DC convertor is unidirectional.

Optionally, the DC/DC convertor is bidirectional.

In some examples, a DC/DC converter and a diode is arranged between the first energy storage device (e.g. UCap) and the second energy storage device (e.g. Li-ion battery) to transfer the energy from the first energy storage device to the second energy storage device and from the second energy storage device to the first energy storage device, respectively. The DC/DC converter can be a simple unidirectional buck converter to supply energy from first energy storage device to the second energy storage device. A freewheeling diode can provide an automatic back-up to the first energy storage device from the second energy storage device.

Optionally, the electric machine is an electric vehicle, and wherein the first energy consuming unit is a propulsion system of the electric vehicle, and wherein the second consuming unit comprises at least one auxiliary system of the vehicle.

In some examples, the invention can provide for an ultra-fast hybrid energy storage device to build a fast and long-life hybrid pack to power an AGV for improving production efficiency. In some examples, the hybrid storage device for the AGV includes ultracapacitors (e.g. UCap, LiCap, etc.) and Li-ion batteries in such a way that the energy requirement is fulfilled. In this strategy, the first energy storage device (e.g. ultracaps) is utilized to provide energy for driving the AGV all the time as well as to charge the second energy storage device (e.g. Li-ion battery) during the course of driving if there is excess energy available.

On the other hand, the second energy storage device (e.g. Li-ion battery) can be utilized to power onboard electronics and perform loading/unloading of materials. Other auxiliary systems are possible, such as for instance units for communication between the AGV and a remote location (e.g. server), lighting, speakers, air conditioning, heating, cooling, wired or wireless communications, etc.

Optionally, the electric vehicle is configured to recover braking energy to the first energy storage device. With lead acid batteries, recovering brake energy is limited. However, with ultracaps or the like as the first energy storage device there exists no such limitation.

Optionally, the ultracaps are dimension based on at least one of a traction power or electric brake power of the electric vehicle.

Optionally, the electric machine is an electrical tool, and wherein the first consuming unit represents at least one higher power subsystem of the tool, and wherein the second consuming unit represents at least one lower power auxiliary subsystem of the tool.

The invention provides for electric machines with added flexibility and/or very low downtime. The invention is not limited to mobility applications, such as vehicles (e.g. AGVs which can perform operations such as handling of objects). The invention can be employed in various other examples and applications requiring energy storage for performing some actions and/or operations, for instance in electric tools such as for example forklifts, mobile high-pressure water washers, etc. The tools may be mobile or immobile, for instance during use. For example, an automatic stacking crane may be immobilized when installed at a location.

A high pressure washer with a conventional battery may require charging for an extended period of time (e.g. overnight) for enabling its operation (e.g. during the day). The invention enables a fast charging (e.g. around 15 minutes), in which case the battery can be reduced and the flexibility can be increased. In case of a very high load, only a limited period of time (e.g. around 15 minutes) may be needed to fully recharge the electric machine, allowing another shift of operation (e.g. 3-4 hours).

The invention enables reducing the charging duration significantly. The ultracaps enable a relatively fast charging. In some examples, a charging time of less than 10 minutes is required, more preferably less than 5 minutes, even more preferably less than 3 minutes, for example 2 minutes.

Optionally, the vehicle includes a controller configured to at least provide power management, the controller being configured to: determine a predetermined route to be travelled by the vehicle between a first charge point and a second charge point; determine a state of charge to which the first energy storage device is fully charged to at the first charge point; determine a total energy required for travelling the vehicle from the first charge point to the second charge point; determine a surplus energy based on the full state of charge and the total energy; and operate the machine such as to use the surplus energy for charging the second energy storage device at least during a portion of travel between the first charge point and the second charge point.

Optionally, the vehicle is arranged for performing loading/unloading actions between at least one of the first or second charge points, wherein the loading/unloading actions are performed by an auxiliary subsystem of the vehicle powered by the second energy storage device.

The loading/unloading or other types of handing can be carried out by means of one or more actuators or manipulators.

Optionally, the first energy storage device has at least five times, preferably at least ten times, more power with respect to the second energy storage device, and wherein the second energy storage device has at least two times more energy capacity with respect to the first energy storage device.

The first energy storage device may provide for and/or absorb significantly more power than the second energy storage device.

In some examples, the first energy storage device has a low energy capacity (e.g. 0.5 kWh) and higher power (e.g. 12 kW). In some examples, the second energy storage device has a high energy capacity (e.g. 1.5 kWh) and lower power (e.g. 500 W).

Optionally, the first energy storage device is configured to be fully charged in less than fifteen minutes, preferably less than ten minutes, more preferably less than five minutes.

The first energy storage device may require significantly less charging time intervals than the second energy storage device for obtaining a full state of charge.

Optionally, the first energy storage device includes at least one of: a flywheel, a hydraulic pressure energy storage arrangement, or a compressed-air energy storage arrangement. Other mechanisms may also be used for storing a relatively large amount of energy in a fast way.

According to an aspect, the invention provides for a method of arranging an electric machine, the method including providing a first energy consuming unit and a second energy consuming unit, the first energy consuming unit requiring a higher power energy source and the second energy consuming unit requiring a lower power energy source, and providing a first energy storage device and a second energy storage device, the first energy storage device having a higher power with respect to the second energy storage device, wherein the first energy storage device is configured to power the first energy consuming unit, wherein the second energy storage device is configured to power the second energy consuming unit, and wherein the first energy storage device is connectable to a charger for charging, the first energy storage device requiring a lower charging time for reaching its maximum state of charge than the second energy storage device, and wherein the first energy storage device is configured to directly provide power to the first energy consuming unit.

A longer charge time may result in a longer non-productive time, which has a detrimental effect on the efficiency. Advantageously, according to the invention, the charging duration can be significantly decreased in order to decrease the non-productive time. Decreasing the non-productive time requires fast charging. This can be achieved by a semi-hybrid strategy. For example, the electric machine can be an electric vehicle including ultracaps for powering the propulsion/traction, and which can charge very fast, and Li-ion batteries, which can be used for transferring energy to auxiliary system and which require longer charging time intervals. The non-productive time can be reduced to zero if charging of the first energy storage device is performed while the vehicle is halted e.g. for materials handling which is powered by the second energy storage device and therefor independent of the charging process.

According to an aspect, the invention relates to a hybrid energy storage system including the higher power energy source and the lower power energy source according to the invention.

It will be appreciated that the circuit element can be a diode which is a two-terminal electronic component that conducts current primarily in one direction. The circuit element may provide for an asymmetric conductance. Alternatively, the circuit element may be a switch controlled in such a way to conduct current primarily in a single direction, and block current flow in the opposite/reverse direction. To achieve this, the circuit element may have a low resistance in one direction (ideally zero), and a high resistance in the other direction (ideally infinite).

In some examples, the diode may be configured to begin conducting electricity only if a certain threshold voltage or cut-in voltage is present in the forward direction (i.e. the direction in which electric current is allowed to flow/pass).

It will be appreciated that the circuit element can have various forms and implementations. In addition to the various types of diodes which can be used, it is also possible to use alternative embodiments, for example electronic components which act as a diode.

It will be appreciated that the circuit element may be a contactor in some exemplary embodiments, the contactor being an electrically-controlled switch used for switching an electrical power circuit such as to allow to conduct electricity in a forward direction, and block current flow in the reverse direction.

It will be appreciated that the super-capacitors as used herein may refer to an ultracapacitor (ultracap, ucap), electric double layer capacitor (EDLC), etc.

It will be appreciated that the electric vehicle can be embodied in various ways. Some examples are a AGV, a tool, a washer, a forklift, and automatic stacking crane, an electric vehicle, an electric bus, a ferry, an electrical truck, a metro, a light rail transport, etc. The electric machine may be used in assembly factories, e-commerce warehousing, automotive and Logistics (harbor and airport), parcel, courier, delivery services and distribution centers, healthcare industry, food and beverage industry, aerospace industry, and manufacturing industry.

It will be appreciated that any of the aspects, features and options described in view of the electric machine apply equally to the system and the described method. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
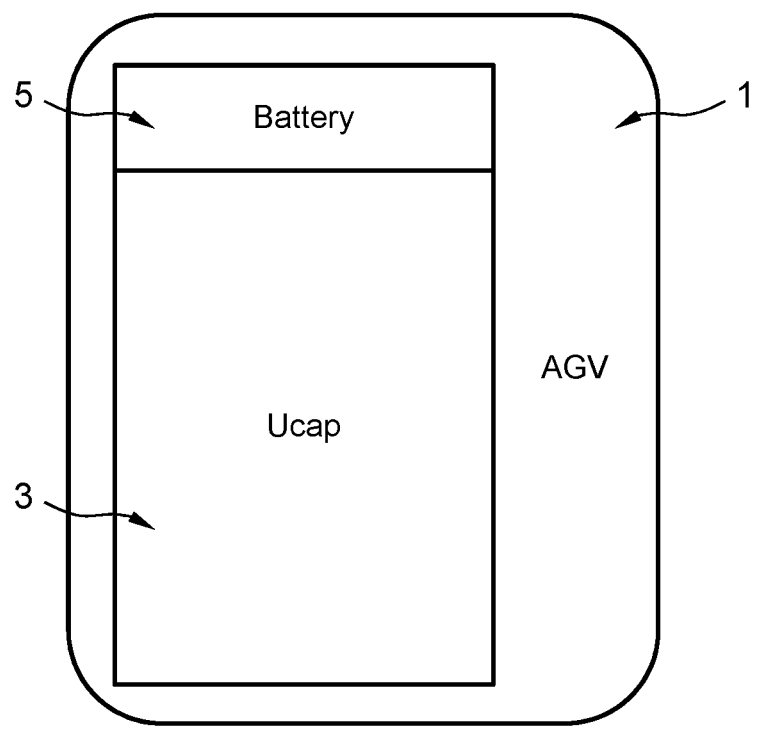
FIG. 1 shows a schematic diagram of an embodiment of a machine.

FIG. 1 shows a schematic diagram of an embodiment of an electric machine 1. The electric machine includes a first energy consuming unit and a second energy consuming unit. In this example, the electric machine is embodied as an AGV, however other devices are also possible (for instance tools such as a high pressure washer, an elevator, a crane, etc.). The first energy consuming unit requires a higher power energy source and the second energy consuming unit requires a lower power energy source. The machine further includes a first energy storage device 3 and a second energy storage device 5, the first energy storage device 3 having a higher power with respect to the second energy storage device 5. In this example, the first energy storage device 3 is embodied as one or more ultracaps, and the second energy storage device 5 is embodied as one or more batteries. The first energy storage device 3 is configured to power the first energy consuming unit, and the second energy storage device 5 is configured to power the second energy consuming unit. The first energy storage device 3 is connectable to a charger for charging. Further, the first energy storage device 3 is configured to require a lower charging time for reaching its maximum state of charge than the second energy storage device 5. Furthermore, the first energy storage device 3 is configured to directly provide power to the first energy consuming unit.

The charger can directly charge the ultracaps. In some examples, the electric machine is configured such that the charger can charge the ultracaps to the maximum allowed voltage in less than 5 minutes, more preferably less than 3 minutes. The charged ultracaps can drive the electric machine (e.g. vehicle or tool). But the electric machine may have auxiliary systems requiring power, e.g. onboard electronics, actuators for performing operational actions such as loading/unloading, etc. In some examples, the invention employs a semi-hybrid energy storage system including ultracaps and batteries (e.g. Li-ion) which can be integrated in the electric machine. The ultracaps can be arranged for driving a power source for driving the vehicle, and can be directly charged (e.g. in less than 5 minutes). The battery may take control of other auxiliary systems (e.g. onboard electronics, loading/unloading, etc.).

Figure 2:
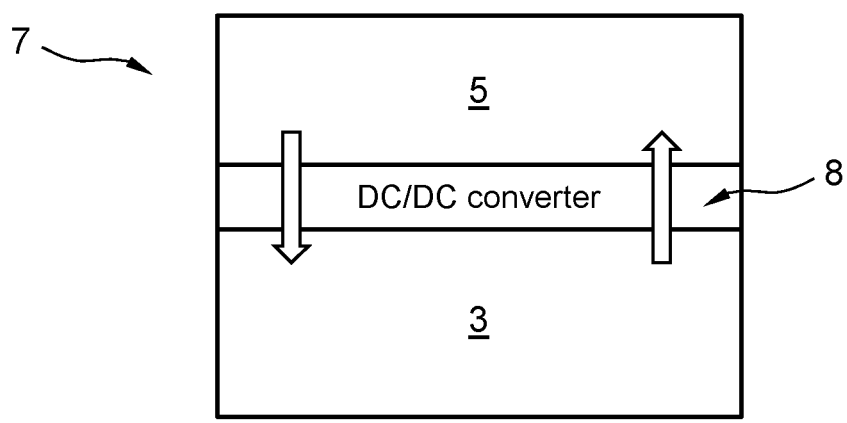
FIG. 2 shows a schematic diagram of an embodiment of a machine.

FIG. 2 shows a schematic diagram of an embodiment of a machine 1, more particularly an energy storage system 7 is shown. The energy storage system 7 of the machine 1 includes a first energy storage device 3 and a second energy storage device 5. A DC-DC convertor 8 is arranged therebetween. The energy transferred from the first energy storage device 3 (e.g. ultracap) to the second energy storage device 5 (e.g. battery) can take place through the DC-DC converter 8. The remaining energy (in the first energy storage device 3) can be transferred to the second energy storage device 5, e.g. for a shorter route travelled by the vehicle. If the energy in the first energy storage device 3 is depleted (or if the device 3 has reached a minimum threshold voltage), driving the vehicle using the first energy storage device 3 may not be possible. In such a case, the second energy storage device 5 may have sufficient state of charge (SoC) available, and can pass the energy through either a diode or through a bidirectional DC-DC converter 8. The energy is transferred from the second energy storage device 5 to the first energy storage device 3 to drive the vehicle in that case, in a backup scenario.

Figure 3:
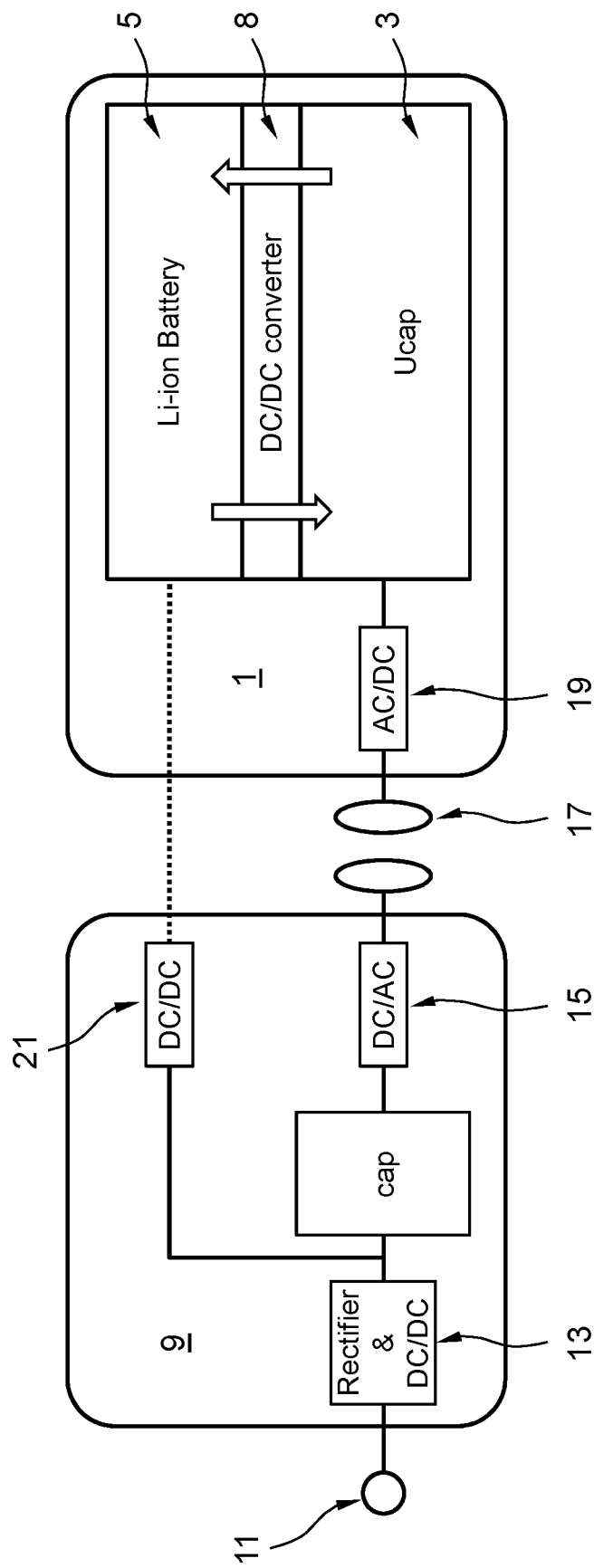
FIG. 3 shows a schematic diagram of an embodiment of a machine.

In this example, the diode is a circuit element arranged between the first and second energy storage devices, wherein the circuit element is configured to allow current to flow only in a single direction from the second energy storage device to the first energy consuming unit. However, other types of circuit elements can also be employed according to the invention. The circuit element can be an electronic or electromechanical device configured to conduct current in one direction. The circuit element can be configured to automatically allow current flow primarily in a single direction (e.g. diode). However, it is also possible that the circuit element is manually-controlled, or automatically-controlled. FIG. 3 shows a schematic diagram of an embodiment of a machine 1 connectable to a charger 9. The charger can be connectable to the grid via connection 11. The charger further includes a rectifier and a DC/DC convertor 13, the output of which is provided to a DC/AC convertor 15 for connection to the port 17 for wireless charging of the first energy storage device (ultracaps in this example). The wireless charging may require additional conversions. In this example, wireless charging is employed, however, a wired charging can also be employed (for example requiring less conversions). For this purpose, the electric machine may also have an AC/DC convertor 19. Furthermore, the output of the DC/DC convertor 13 may be connectable to an optional DC/DC convertor 21 arranged for connection to the second energy storage device 5 (Li-Ion battery in this example).

The shown embodiment is FIG. 3 may represent a schematic example of a hybrid energy storage device in an AGV 1 connectable to a charger 9. In this example, the 12 kW charger charges the Ucaps to full in 3 minutes. The energy required by the AGV (driving+loading/unloading of materials+power supply to onboard electronics) is known in advance at the charging point, before the AGV starts driving on a predetermined route. It is calculated whether the energy provided to the UCaps during the charging is sufficient for the vehicle propulsion only for a complete driving cycle/route. For example, the route length could be more than 1 hour of driving and the available energy in UCaps is sufficient to drive the AGV only. In that case, the power for the onboard electronics and loading/unloading of materials will be supplied from the battery. The DC/DC converter 8 arranged between the first energy storage device 3 and the second energy storage device 5 can be disabled. If the selected driving cycle/route is shorter and the energy provided to the UCaps during the charging is more than sufficient for vehicle propulsion for a complete driving cycle/route, then excess energy from the Ucap can be transferred to the battery through the DC/DC converter 8. Thus the battery can be charged regularly when the vehicle is in operation. This way, the battery powers on-board electronics and loading/unloading processes directly as these loads require a constant voltage. Furthermore, if the voltage across the UCap drops to its minimum threshold voltage while the AGV is in operation then the battery will take over from the UCaps and can provide sufficient energy for limp home vehicle propulsion through the freewheeling diode. Furthermore, if the vehicle is stopped due to some unforeseen obstacles or foreign objects, the DC/DC converter 8 can be disabled to make sure that the energy in the Ucap remains sufficient to complete the driving cycle/route and to return to the charging point once the foreign object is removed. Further, if the vehicle stops for loading/unloading of materials at certain points along the driving cycle/route then this duration can be utilized to charge the UCap because the battery powers the on-board electronics and loading/unloading process directly independent from the charging process. In some examples, a goal of the energy management is to depart at the charger with a full Ucap and to return to it with an empty Ucap. In this way the maximum amount of energy can be transferred during charging. The DC/DC converter 8 can be used to achieve this goal by charging the onboard battery.

Although the above example is for an electric vehicle, also other applications are possible, for instance other tools, high pressure washers, cranes, elevators, etc.

The electric machine may for instance be a high pressure washer comprising an auxiliary pump (to circulate water), a cooling unit, an electrical heating unit, controls of the heater, etc. The high pressure pump can be considered as the first energy consuming unit. Spraying of water may be performed for instance only 10% or 20% of the total time in which the high pressure washer is operating. Hence, in this example 80% to 90% of the time the high pressure mump may be not activated. However, the auxiliary systems (e.g. heating, cooling, and other auxiliary units) remain working, consuming energy.

Figure 4A:
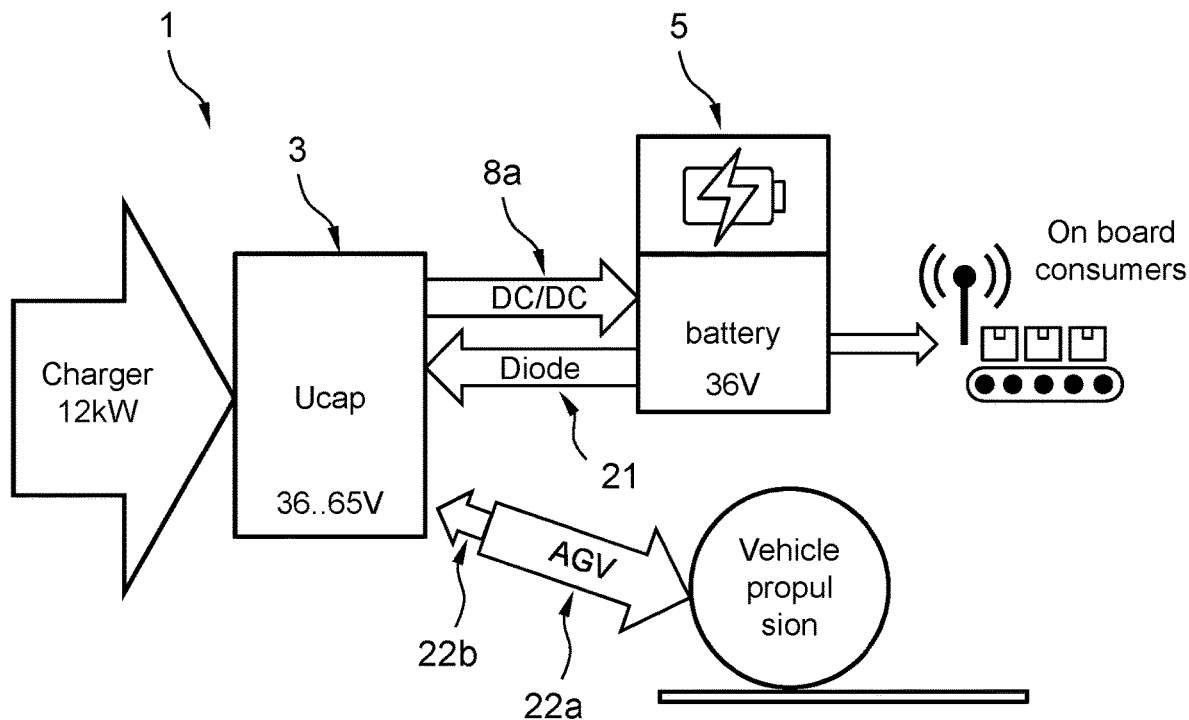
FIG. 4a, 4b show a schematic diagram of an embodiment of a machine.
Figure 4B:
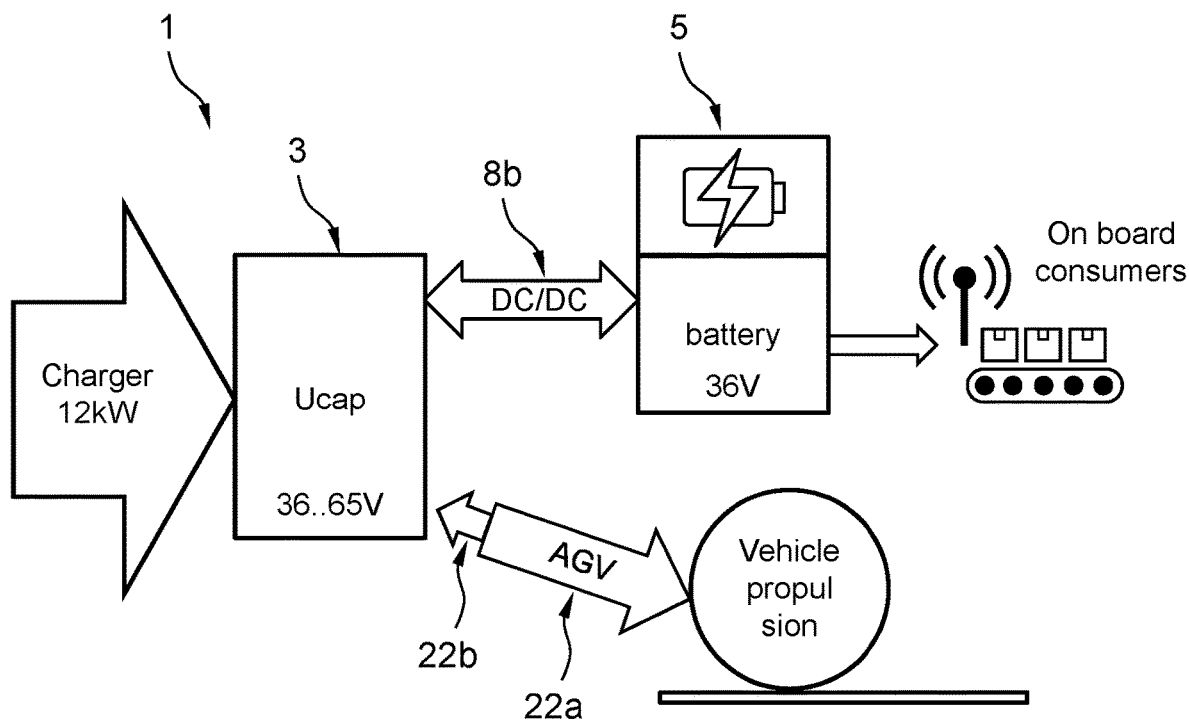

FIG. 4a, 4b show a schematic diagram of an embodiment of a machine 1. In these examples, the machine 1 is an AGV. However, the electric machine may be embodied as other electric tools as well. FIG. 4a shows a schematic representation of a hybrid storage device (Ucap and battery) in an AGV and its usage strategy. In the shown embodiment of FIG. 4a, a DC/DC converter and a diode 21 between the first energy storage device 3 (e.g. UCap) and the second energy storage device 5 (e.g. Li-ion battery) to transfer the energy from the first energy storage device 3 to the second energy storage device 5 and from the second energy storage device 5 to the first energy storage device 3, respectively. The DC/DC converter 8a is a simple unidirectional buck converter to supply energy from UCap to the battery. A freewheeling diode provides an automatic back-up to the UCap from the battery. FIG. 4b shows a schematic representation of a hybrid storage device (Ucap and battery) in an AGV and its usage strategy. In the shown embodiment of FIG. 4b, a bi-directional DC/DC converter 8b is arranged between the first energy storage device 3 and the second energy storage device 5. The limited use of DC/DC conversion (in time and direction) can result in less losses due to DC/DC conversion, i.e. a higher energy efficiency.

The first energy storage device 3 (e.g. ultracaps) can be configured to always drive the propulsion in normal use of the electric vehicle. All the energy for the vehicle to actuate the drive for moving may thus come from the first energy storage device 3 (this may be the case in normal conditions, unless e.g. the ultracaps are completely discharged before the vehicle reaches the charging point, then the second energy storage device 5 (e.g. battery) can take over and supply energy to either the diode 21 or the bidirectional DC/DC convertor 8b. In such a case, the second energy storage device 5 (e.g. battery) operates as a back-up. It is desired that the first energy storage device 3 (e.g. ultracaps) provide energy for propulsion, but in a worst case scenario, when there is not enough energy left in the second energy storage device 5 (e.g. battery), the second energy storage device 5 can take over the first energy storage device as a backup system.

There may be a loading and unloading of materials by the vehicle as an auxiliary system. If charging and actuation (e.g. material handling, unload/loading of objects, etc.) is performed simultaneously, a conventional battery system may experience overvoltage. This technical problem often occurs when using batteries, such as for instance lead acid batteries, as an energy source. For example, during charging the voltage may be increased (e.g. 29 V instead of 24 V nominal). During charging, the voltage is around 29 V. The onboard electronics is not capable of coping with the higher voltage, and can damage the electronics. If you want to limit that, the charging time goes up (thus downtime goes up as well). The limitation of the voltage is a technical solution, but it is detrimental with respect to the economic balance (more downtime).

This problem is also resolved by means of the current invention, in which the power source for displacement and power source for auxiliary subsystems such as loading/unloading are segregated. In some examples, the electric vehicle can be driven and/or charged with ultracaps as power source, and the battery can be used for performing auxiliary tasks such as, inter alia, handling actions (e.g. loading/unloading), providing power to onboard electronics, etc.

Illustrative numbers indicating the exemplary relationship between the components as shown in FIG. 4 can be given as follows: UCap energy content=460 Wh; battery=1200 Wh; DC/DC=500 W; propulsion=3 kW; charger power rating=12 kW; UCap voltage range=33 V to 57 V; battery voltage range=30 V to 42 V.

In some examples, no DC convertor is arranged in the traction line (energy flow). This can result in a significant cost saving and reduced losses. The use of the ultracap is high power, and the price of the DC convertor is determined by the power of the DC convertor. Hence, an ultracap with a convertor will be more expensive than a battery with a convertor. A capacitor is inherently a high power device. This is advantageous design with respect to the case that the ultracap is arranged to absorb the charge of the charger and convert it to a larger battery and power the drive line from the battery. But then there are two conversions for the traction energy, one for the ultracap to the battery, and then for the battery to the traction motor (wheels). Advantageously, the invention can bypass one conversion for the main energy flow.

The electric vehicle may be arranged for recuperating braking energy to the first energy storage device. The first energy storage device (e.g. ultracaps) can be dimensioned based on at least one of a traction/propulsion power or electric brake power of the electric vehicle. In this example, arrow 22a indicates a traction/propulsion power for driving the vehicle, and arrow 22b indicates an exemplary energy recuperation by electric braking.

Figure 5:
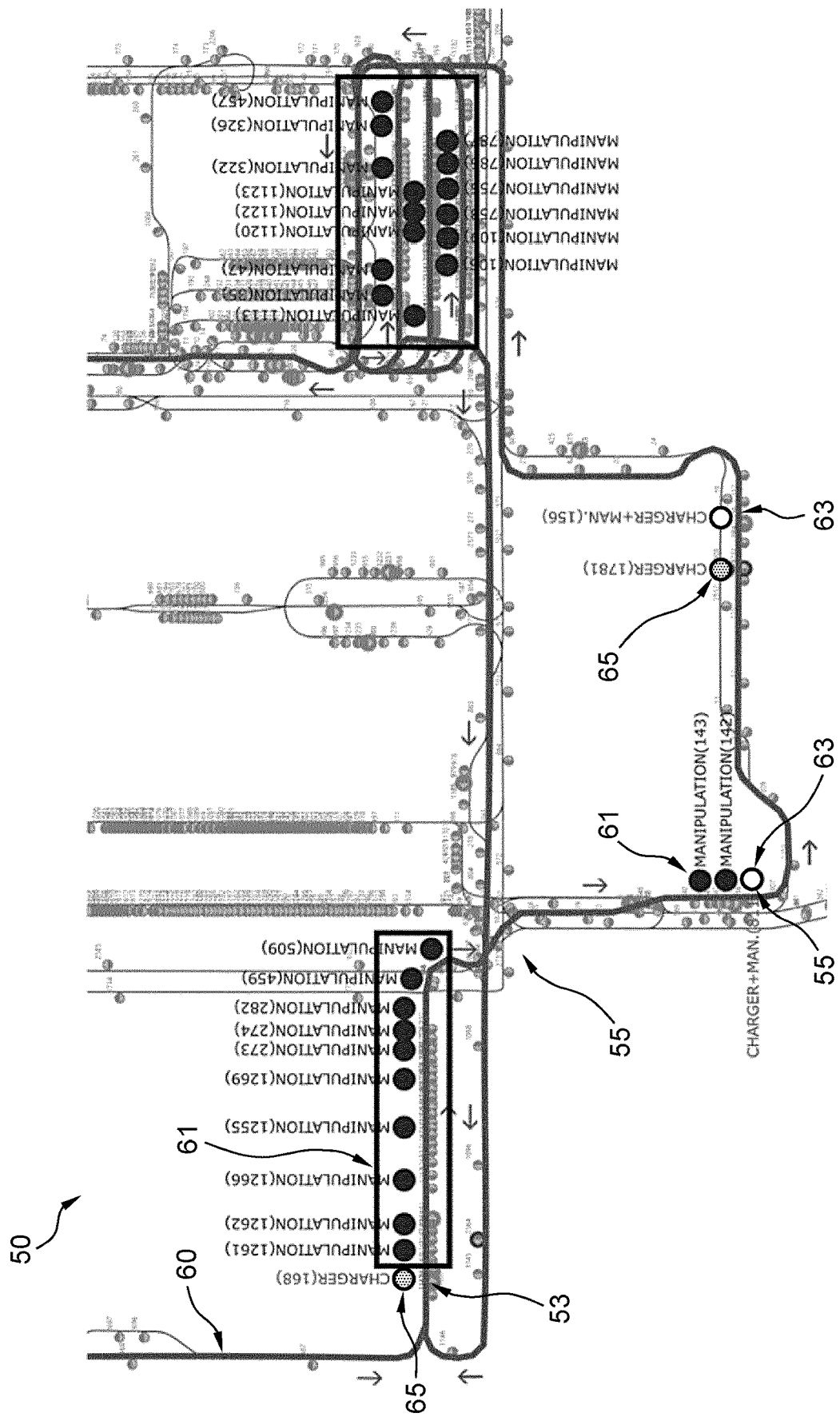
FIG. 5 shows a schematic diagram of an embodiment of a vehicle route.

FIG. 5 shows a schematic diagram of an embodiment of a vehicle route 50. The electric machine may be an electric vehicle including a controller configured to at least provide power management. The controller can be adapted to determine a predetermined route 51 to be travelled by the vehicle between a first charge point 53 and a second charge point 55. Further, the controller can be adapted to determine a state of charge to which the first energy storage device 3 is fully charged to at the first charge point, and to determine a total energy required for travelling the vehicle from the first charge point to the second charge point, and to determine a surplus energy based on the full state of charge and the total energy. Furthermore, the controller can be adapted to operate the machine such as to use the surplus energy for charging the second energy storage device 5 at least during a portion of travel between the first charge point 53 and the second charge point 55. The vehicle can be arranged for performing loading/unloading actions between at least one of the first or second charge points, wherein the loading/unloading actions are performed by an auxiliary subsystem of the vehicle powered by the second energy storage device 5.

Electric vehicles (e.g. AGVs) can be employed for various application, such as for instance in a plant, factory or warehouse. Line 60 represents a path the vehicle has to cover. Dots 61 indicate locations where the vehicle has to stop for performing some actions, such as for instance loading and unloading. Dots 63 (green dots) represent charge points, at which locations the vehicle can stop charge and load and unload (2 functions together: charging+load/unload). Dots 65 indicate locations where the electric vehicle can charge.

Figure 6:
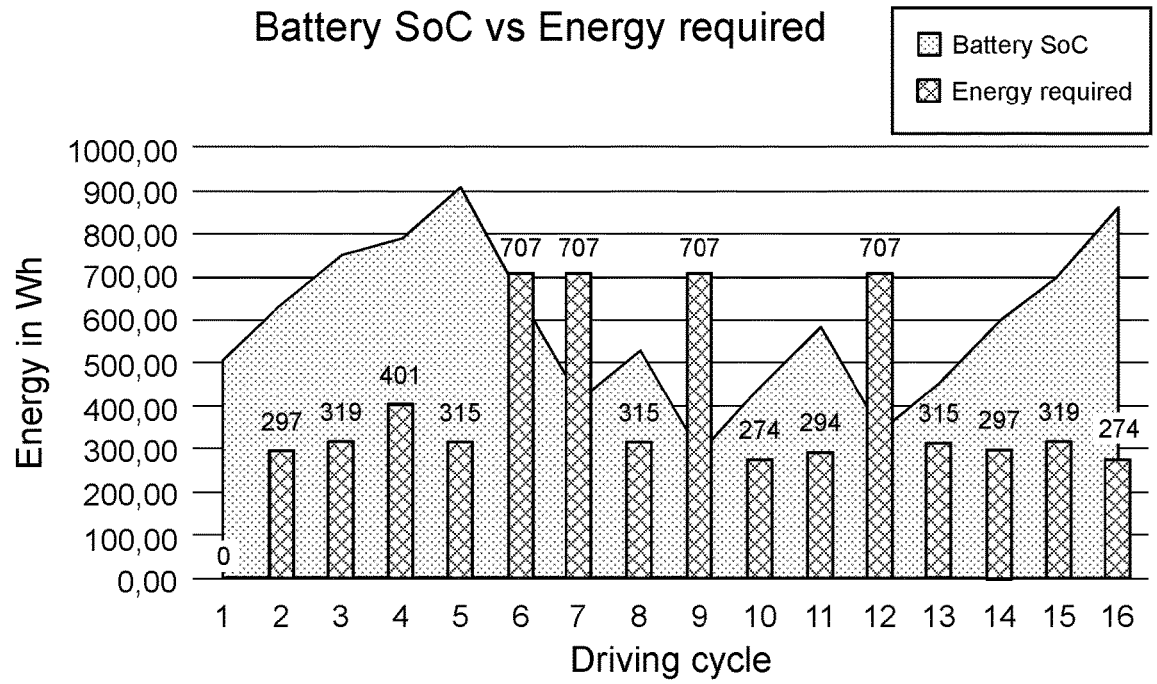
FIG. 6 shows a schematic diagram of a graph.

FIG. 6 shows a schematic diagram of a graph 100 indicating battery state of charge versus energy required by AGV during the driving cycle. At the beginning of an initial route, the battery state of charge (SoC) is assumed to be at 50% and the UCap is empty. The Ucap is fully charged with 460 Wh by the charger. The first driving cycle requires a total of 297 Wh. Hence during the next charging session the battery will be charged with 460 Wh−187 Wh=273 Wh.

At charging session 5, the longest work cycle is anticipated (Energy required=707 Wh). All energy in the Ucap (460 Wh) is needed for traction and energy for on-board consumers and loading/unloading (707 Wh-460 Wh=247 Wh) is slowly discharged from the battery.

The order of work in this cycle is considered to be a realistic worst case scenario for a 16 hour shift. The battery SoC at the end is higher than at the beginning indicating that this system is completely self-sustaining, i.e. no maintenance charge (resulting in unproductive time) is required.

FIG. 6 shows a table of energy utilization. In this example, a DC/DC converter and a diode is arranged between an exemplary LiCaps (have a minimum voltage requirement) and Li-ion battery to transfer the energy from the LiCaps to the battery and from the battery to the LiCaps (in case the voltage of LiCaps reaches its minimum), respectively. LiCaps can operate from 2.2 V to 3.8 V. The hybrid storage contains 16 cells of LiCaps in series and 7 in parallel to provide an operating voltage between 33 V to 57 V. Besides the LiCaps, a Li-ion battery string of 10 cells with a voltage between 30 V to 42 V is present. The DC/DC converter can be a simple unidirectional buck converter. Its internal freewheeling diode provides an automatic back-up to the LiCaps by the battery. The BMS takes care of the voltage balancing of the LiCaps and the battery along with controlling the converter. The diode avoids a voltage drop below the minimum voltage requirement of the LiCaps.

The AGVs can have different energy requirements such as propulsion/driving, loading/unloading (i.e. handling), power supply for onboard electronics. The AGV may operate at a constant velocity. The duration of the route and the energy required for the route may be known in advance. In this example, the ultracaps of the AGVs can be directly charged in approximately 3 minutes. An energy of 460 Wh can be stored in the ultracaps. The amount of energy require for the propulsion for each subroute can be calculated. This can be separated from the energy required for the auxiliary systems (e.g. electronics, and handling (i.e. loading/handling), etc. Further, the energy requirements of the AGV can be predetermined and estimated. For example, the ultracaps can be fully charged to 460 Wh, but the energy required for driving may be 300 Wh, such that 160 Wh can be left when the vehicle completes the subroute. The required energy may be based on an estimation, for instance using historic data. Small fluctuations in the estimation may be possible. Since additional energy (surplus) is left in the ultracaps, the surplus energy can be transferred to the battery (i.e. charging the battery).

It is desired that the vehicle arrives at a charging point with the ultracaps approximately empty, so that they can be charged with the highest possible amount of energy. The energy stored in the ultracaps are primarily used for propulsion. Therefore, surplus energy can also be transferred to the battery so that it does not get depleted. Typically, the battery cannot handle fast charging as the ultracaps. The ultracaps may have a lower energy density than the battery. However, the ultracaps can be charged significantly faster compared to the battery.

The AGVs may have two energy demands, a primary energy demand for driving/propulsion, and a secondary energy demand for auxiliary (sub)systems. The AGVs may be configured to perform multiple cycles without needing to charge the battery, which can be considered as a lengthy process, typically immobilizing the AGV. Re-charging li-ion batteries or lead acid batteries can for instance take hours.

Advantageously, the AGV can be charged with the maximum amount of energy each time the ultracaps are charged at the charger. In some examples, the electric machine can be configured to consume a large portion of the energy stored in the ultracaps (e.g. also for recharging the battery next to driving the propulsion of the vehicle) so that it is quasi-empty when arriving at a next charging point, since the ultracaps are charged to the maximum amount of energy on every charging occasion at a charge point.

In some examples, the ultracaps can be used for providing the energy required for propulsion/driving the vehicle, and the battery can be used for providing the energy required for operating other actuators, handling, onboard electronics, etc. The driving power can be relatively high compared to the power required for onboard electronics. Driving power may for instance be 3 kW, whilst the onboard electronics may for instance be 200 W (15 times less). The power for the auxiliary systems (e.g. onboard electronics) may be much lower, but the vehicle is sometimes stopped in which case it does not consume energy from the ultracap providing the propulsion energy. However, when the vehicle is stopped, the auxiliary systems may still require energy. The ultracaps can be sized to be as small as possible in terms of energy content (the energy density is very low, which results in a relatively large space requirement. The power density of the ultracaps is relatively high.

Optionally, at every charging occasion the first energy storage device (e.g. ultracaps) are charged to its maximum charge. The ultracaps may be sized as small as possible, while being configured to provide the traction energy for the longest route. In some examples, that can be considered as a minimum size of the ultracap.

When the AGV is not travelling on the longest route, i.e. a route that is shorter than the longest route which can be known in advance, this gives the opportunity to transfer energy from the first energy storage device (e.g. ultracap) to the second energy storage device (e.g. battery). This transferred energy can be such that the battery is kept in balance over a longer period.

Optionally, the energy content of the first energy storage device is sized according to a traction energy required for the longest route of the plurality of successive routes.

For the shorter route not all the energy from the ultracap may be needed. A route can be defined as a trajectory between two charging locations. If a charging location is skipped in a route, it may be considered as one route in some examples. Traction or propulsion (driving actuation) can be considered as a high-power load. The electric machine may have a high-power consumer (cf. first energy consuming unit) and a low-power consumer (cf. second energy consuming unit). The first energy storage device can be configured to power the high-power consumer (e.g. 3 kW), and the second energy storage device can be configured to power the low-power consumer (300 W-200 W).

If the route is shorter, the amount of energy left in the first energy storage device (e.g. ultracap) can be transferred to the battery. The battery can be configured to provide energy for the auxiliary systems, such as for instance the onboard electronics. For the longest route, a large portion of the available energy may be provided for propulsion.

The first energy storage device (e.g. ultracap) can be charged during the material handling. The material handling uses energy from the second energy storage device (e.g. battery). The first energy storage device may be completely separated from the second energy storage device. Hence, advantageously, the charger can be placed at material handling spots, charging the ultracap without influencing the voltage on the second energy storage device (e.g. battery).

At a charging spot, the first energy storage device of the vehicle may be charged with the maximum amount of energy that it can store. When the first energy storage device (e.g. ultracap) is depleted (reduced to its minimum threshold voltage), the second energy storage device (e.g. battery) can take over and transfer energy to the diode or the DC-DC converter.

In the table:

$E_{cap\ start}$ indicates the energy stored in the ultracaps when the vehicle starts. In this example, the ultracap is fully charged to 460 Wh;

$E_{cap\ end}$ indicates the energy stored in the ultracaps when the vehicle arrives and completes its route. In some examples, it is desired that the ultracaps are discharged to zero, so that it can be again charged to with a maximum amount of energy (cf. $E_{cap\ start}$ 460 Wh);

$E_{cap\ needed}$ indicates the amount of energy needed for traction or propulsion of the vehicle on the projected route;

$E_{bat\ needed}$ indicates the amount energy required for onboard electronics and material handling during the projected route;

$E_{to\ bat}$ indicates the amount of energy transferred from the ultracaps to the battery in the case when the routes are shorter (i.e. energy transfer);

$E_{in\ bat}$ indicates the SoC of the battery after the route is completed;

P DC/DC indicates the power that is to be transferred between the ultracaps to the battery through the DC-DC converter.

The exemplary table provides information indicating which route the vehicle will pass and how much energy is required. A planned route may have a plurality of subroutes between charging points. The route and the subroutes may be predefined, such that the energy requirement is also predefined. If the vehicle is running on a particular route, the subroutes may have a different energy requirement.

The vehicle can take a different sequence of (sub)routes. And for each subroute, the vehicle consumes energy (more energy is consumed for longer subroutes, and less energy is consumed for shorter subroutes).

The maximum energy required for travelling along the longest (sub)route can be known (e.g. 700 Wh). If the vehicle is running on the longest route, the ultracaps of the vehicle can be configured to be able to deliver all the energy to drive the vehicle. The amount of energy required for travelling along the shortest (sub)route can also be known. The first energy storage device (e.g. ultracaps) can be designed based on this information. For example, when designing the vehicle, it can be seen how many ultracaps are needed for the longest route that the vehicle is going to travel, and how much energy charging the vehicle needs so that when the vehicle moves along the longest route the vehicle can be driven by the ultracap.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. An electric machine including a first energy consuming unit and a second energy consuming unit, the first energy consuming unit requiring a higher power energy source and the second energy consuming unit requiring a lower power energy source, wherein the machine further includes a first energy storage device and a second energy storage device, the first energy storage device having a higher power with respect to the second energy storage device, wherein the first energy storage device is configured to power the first energy consuming unit, wherein the second energy storage device is configured to power the second energy consuming unit, and wherein the first energy storage device is connectable to a charger for charging, the first energy storage device requiring a lower charging time for reaching its a maximum state of charge than the second energy storage device, and wherein the first energy storage device is configured to directly provide power to the first energy consuming unit, wherein the first energy storage device and the second energy storage device are adapted such that the second energy storage device automatically provides a backup power source for powering the first energy consuming unit when a voltage of the first energy storage device is below a voltage threshold value, wherein the electric machine comprises a circuit element electrically connecting to the first and second energy storage devices, wherein the circuit element is configured to allow current to flow only in a single direction from the second energy storage device to the first energy consuming unit.

2. The electric machine according to claim 1, wherein the first energy storage device includes one or more supercapacitors, and wherein the second energy storage device includes one or more batteries.

3. The electric machine according to claim 1, wherein the circuit element is a diode allowing only current flow from the second energy storage device through the diode to the first energy consuming unit in case the second energy storage device provides the backup power source for the first energy consuming unit.

4. The electric machine according to claim 1, wherein the circuit element is an electronic controlled switch configured to allow current flow only in one direction from the second energy storage device to the first energy consuming unit in case the second energy storage device provides the backup power source for the first energy consuming unit.

5. The electric machine according to claim 1, wherein a DC/DC convertor is arranged between the first energy storage device and second energy storage device, the DC/DC convertor enabling at least current flow from the first energy storage device to the second energy storage device.

6. The electric machine according to claim 5, wherein the DC/DC convertor is unidirectional.

7. The electric machine according to claim 5, wherein the DC/DC convertor is bidirectional.

8. The electric machine according to claim 1, wherein the electric machine is an electric vehicle, and wherein the first energy consuming unit is a propulsion system of the electric vehicle, and wherein the second consuming unit comprises at least one auxiliary system of the vehicle.

9. The electric machine according to claim 1, wherein the electric machine is an electrical tool, and wherein the first consuming unit represents at least one higher power subsystem of the tool, and wherein the second consuming unit represents at least one lower power auxiliary subsystem of the tool.

10. The electric machine according to claim 1, wherein the vehicle includes a controller configured to at least provide power management, the controller being configured to:
  determine a predetermined route to be travelled by the vehicle between a first charge point and a second charge point,
  determine a state of charge to which the first energy storage device is fully charged to at the first charge point,
  determine a total energy required for travelling the vehicle from the first charge point to the second charge point,
  determine a surplus energy based on the full state of charge and the total energy, and
  operate the machine to use the surplus energy for charging the second energy storage device at least during a portion of travel between the first charge point and the second charge point.

11. The electric machine according to claim 10, wherein the vehicle is arranged for performing loading/unloading actions between at least one of the first or second charge points, wherein the loading/unloading actions are performed by an auxiliary subsystem of the vehicle powered by the second energy storage device.

12. The electric machine according to claim 1, wherein the first energy storage device has at least five times more power with respect to the second energy storage device, and wherein the second energy storage device has at least two times more energy capacity with respect to the first energy storage device.

13. The electric machine according to claim 1, wherein the first energy storage device is configured to be fully charged in less than fifteen minutes.

14. The electric machine according to claim 1, wherein the first energy storage device includes at least one of: a flywheel, a hydraulic pressure energy storage arrangement, or a compressed-air energy storage arrangement.

15. A method of arranging an electric machine, the method including
  providing a first energy consuming unit and a second energy consuming unit, the first energy consuming unit requiring a higher power energy source and the second energy consuming unit requiring a lower power energy source, and
  providing a first energy storage device and a second energy storage device, the first energy storage device having a higher power with respect to the second energy storage device,
  wherein the first energy storage device is configured to power the first energy consuming unit, wherein the second energy storage device is configured to power the second energy consuming unit, and
  wherein the first energy storage device is connectable to a charger for charging, the first energy storage device requiring a lower charging time for reaching a maximum state of charge than the second energy storage device, and
  wherein the first energy storage device is configured to directly provide power to the first energy consuming unit,
    wherein the first energy storage device and the second energy storage device are adapted such that the second energy storage device automatically provides a backup power source for powering the first energy consuming unit when a voltage of the first energy storage device is below a voltage threshold value,
    wherein the electric machine comprises a circuit element electrically connecting to the first and second energy storage devices,
    wherein the circuit element is configured to allow current to flow only in a single direction from the second energy storage device to the first energy consuming unit.

16. The electric machine according to claim 12, wherein first energy storage device has at least ten times more power with respect to the second energy storage device.

17. The electric machine according to claim 13, wherein the first energy storage device is configured to be fully charged in less than ten minutes.

18. The electric machine according to claim 17, wherein the first energy storage device is configured to be fully charged in less than five minutes.

* * * * *